Dec. 29, 1970 R. E. CAMPBELL 3,550,195
APPARATUS FOR PRILLING SULPHUR
Original Filed Sept. 17, 1964 4 Sheets-Sheet 2

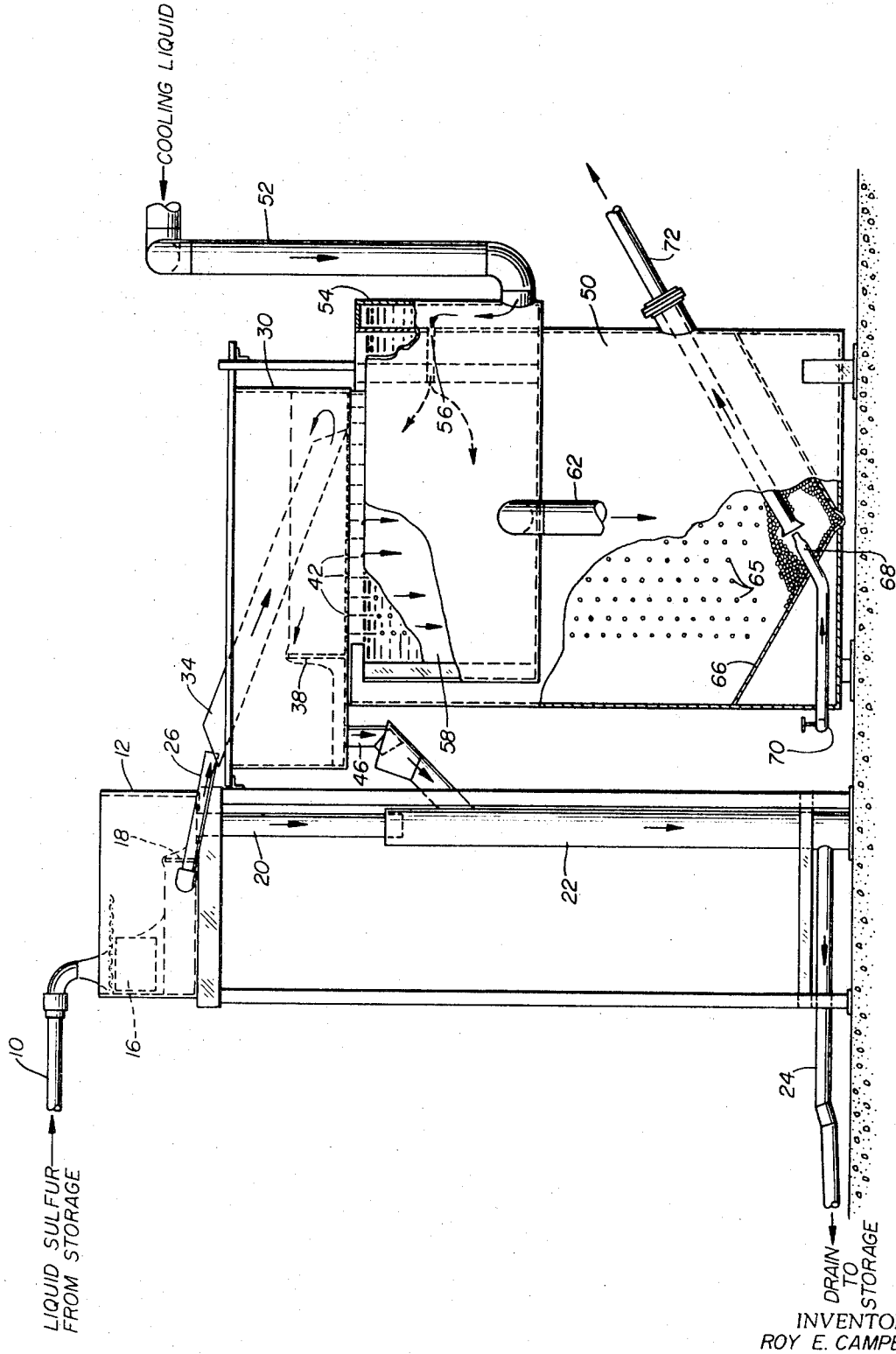

INVENTOR.
ROY E. CAMPBELL
BY
Head & Johnson
ATTORNEYS

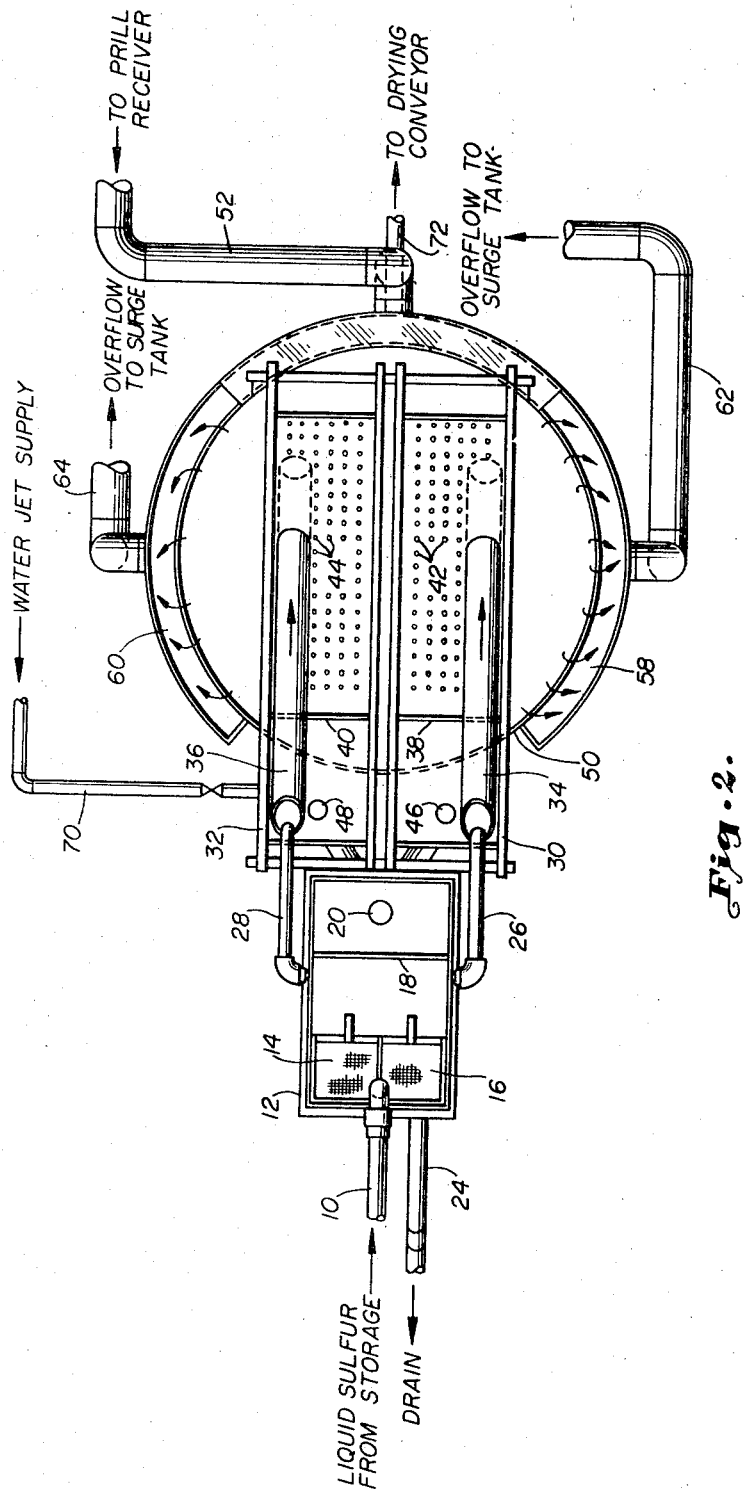

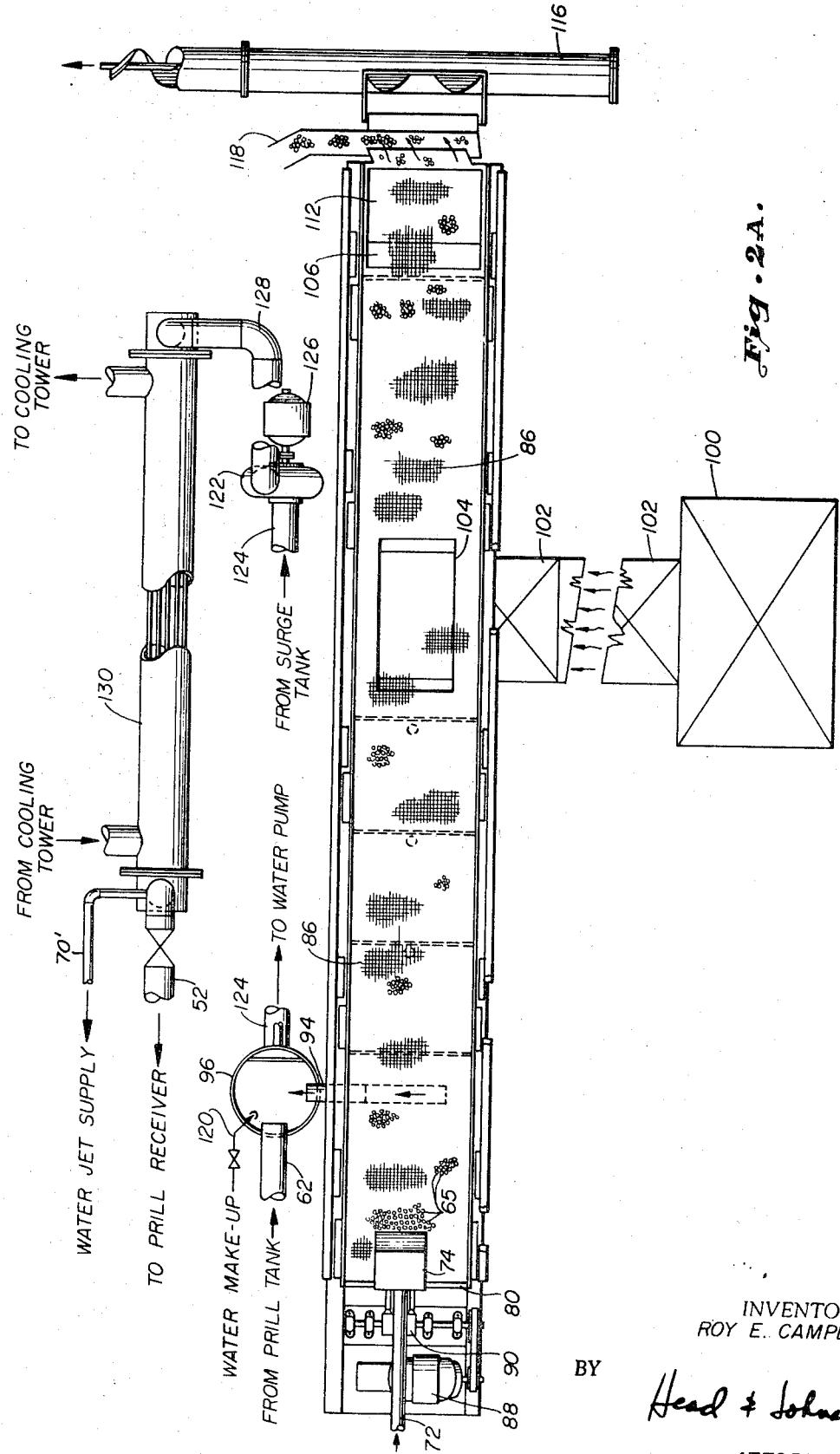

United States Patent Office 3,550,195
Patented Dec. 29, 1970

3,550,195
APPARATUS FOR PRILLING SULPHUR
Roy E. Campbell, Midland, Tex., assignor to National Sulphur Company, Midland, Tex., a corporation of Texas
Original application Sept. 17, 1964, Ser. No. 397,076, now Patent No. 3,334,159, dated Aug. 1, 1967. Divided and this application July 21, 1967, Ser. No. 664,585
Int. Cl. B22d 23/08
U.S. Cl. 18—2.7                                                     1 Claim

ABSTRACT OF THE DISCLOSURE

Prilled or substantially spherical sulphur particles are produced in an apparatus which maintains a constant head of molten sulphur at about 320° F. upon a perforated plate. The head of liquid and perforations are such that a continuous stream of sulphur passes into a cooling liquid positioned below the perforated plate such that sulphur particles are formed after submergence therein.

CROSS REFERENCES TO RELATED APPLICATION

This application is a division of copending application S.N. 397,076, filed Sept. 17, 1964, and now U.S. Pat No. 3,334,159.

Sulphur is one of the elements essential to plant life. In many geographic areas there is an adequate quantity of sulphur available to plant life in the native soil, in the form of condensed sulphur in rainfall or as sulphur compounds in irrigation water. In areas where adequate sulphur is not available from these sources, the soil must be supplemented with sulphur from other sources. In alkaline soils sulphur is needed as a soil amendment in addition to providing nutrient requirements. As a soil amendment sulphur will increase soil water intake and aeration, improve physical condition of the soil, eliminate harmful alkalinity and sodium problems and increase the availability to the plant of certain elements in the soil that are necessary for plant life. The additional crop yield and quality resulting from use of sulphur when needed justifies the cost of application.

Sulphur may be applied in several forms but preferably as elemental sulphur. The elemental sulphur is oxidized in the soil by microorganisms to sulphur oxides which together, with soil moisture give the desired sulphur benefits.

Elemental sulphur is available in ground and flaked forms. These forms have several disadvantages such as the finer particles are irritating to personnel handling the material and present an explosion hazard. If the finer particles are screened away, shipment and handling of the remainder results in breakage into more fines. Also, because of the size distribution of these forms of elemental sulphur uniform distribution is difficult, if not impossible, either when applied separately or blended with other commercial fertilizer.

An object of this invention is to provide apparatus for producing prilled sulphur wherein the size of the prills can be controlled in order that the prills substantially match that of other materials with which it may be blended.

A yet further object is to produce prilled sulphur particles free of fine particles, resistant to breakage and easier to handle or transport than other forms of solid sulphur.

A yet further object of this invention is to provide a method of producing prilled elemental sulphur wherein a constant pressure head of molten sulphur is permitted to pass through a perforated prilling head into a constant level cooling liquid which causes the molten streams of sulphur to form prills or small spherical shaped granules which are thereafter collected, dried, and stored for later use either alone or in conjunction with other soil conditioning agents or fertilizers.

A still further object of this invention is to provide apparatus for producing dry-prilled elemental sulphur.

These and other objects of this invention will become more apparent upon further reading of the specification and claims when taken in conjunction with the following illustrations, of which:

FIG. 1 is a side elevational view, partly in cross-section, depicting the prill forming apparatus and methods.

FIGS. 2 and 2A are respective top elevational views of the apparatus depicted in FIGS. 1 and 1A.

Figure 1A:
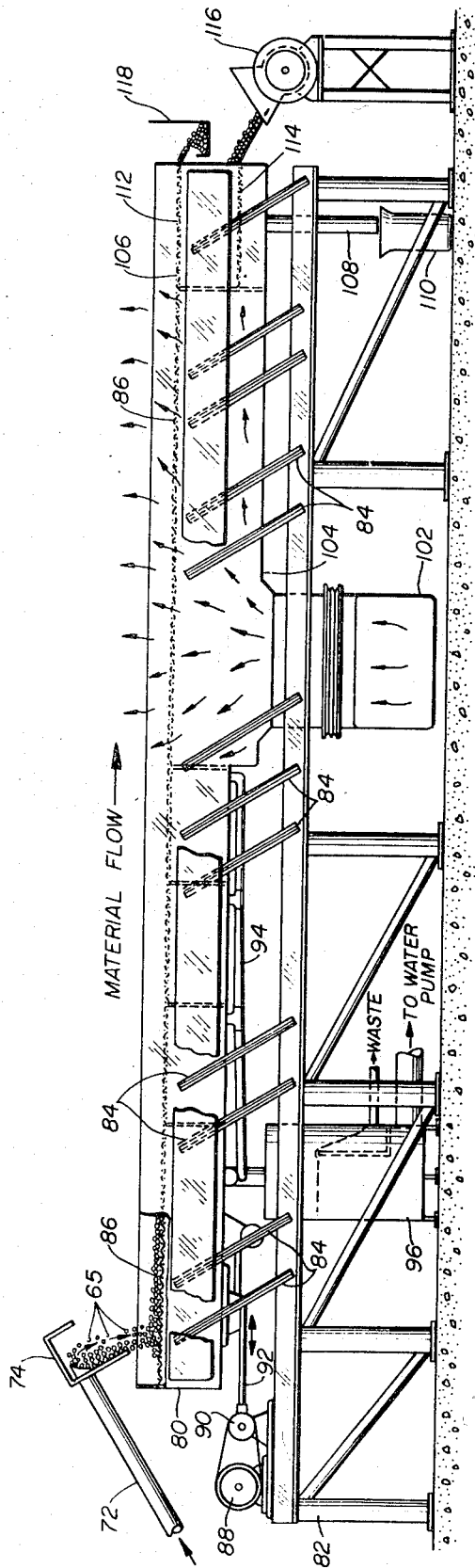
FIG. 1A is a continuation of FIG. 1 and is a side elevational view, partly in section, describing the apparatus for drying prilled sulphur.

Referring now to the drawings in detail, molten elemental sulphur enters the system through conduit 10 into a first sulphur receiving tank 12 wherein the molten sulphur is caused to pass through replaceable filter elements 14 and 16. Upon passing through the filter the molten sulphur is held at a desired level using, for example, weir 18. The excess molten sulphur passes over the weir into drain 20 and manifold 22 for recirculation through drain pipe 24 back into the molten sulphur supply source, not shown. The circulation of molten sulphur into the sulphur receiver in this manner maintains this portion of the equipment above the solidification temperatures of sulphur.

Molten sulphur is removed from upstream of the weir 18 through two conduits 26 and 28 into two side-by-side prilling head receiving tanks 30 and 32 by way of conduits 34 and 36 which cant into the respective prilling and receiving tanks is shown. Each of the prilling and receiving tanks includes respective weirs 38 and 40 to maintain a constant level of molten sulphur above a multiplicity of perforations in the bottom of each tank. As a specific example 500 perforations formed by a No. 70 twist drill were used in producing prills approximately 0.050" to 0.090" in diameter, these perforations being identified by the numerals 42 and 44 of each receiver respectively. In some instances molten sulphur directly from its supply source can be directed into the prilling head receiving tank directly as an alternative to the using of the primary sulphur receiving tank 12. Downstream of weir 38 are respective drain openings 46 and 48 which tie directly into the manifold and drainage supply conduits 22 and 24.

Directly below the prilling head receiving tanks and perforations 42 and 44 is prill receiving tank 50, within which constant temperature cooling water is maintained at a constant level. Cooling liquid at a constant given temperature is received or enters from a heat exchange unit 130 shown only in FIG. 2A, where it has been cooled to a desired temperature, into supply conduit 52 and manifold 54 opposite a submerged weir 56 in the main body of the prill receiver tank 50. A constant level of liquid is maintained by the provision of opposite weir tanks 58 and 60 into which cooling liquid overflows through conduits 62 and 64 as shown by the arrows for recirculation through the surge tank 96, pump 122 and heat exchange system 130. The bottom of the prill receiver tank 50 is sloped to divert the prills toward a location adjacent to jet pump nozzle 68 which is supplied with liquid by way of conduit 70 from the conduit 70' shown in FIG. 2A. Outlet conduit 72 carries liquid and prills to the drying system more aptly shown in FIGS. 1A and 2A.

For a description of the drying steps in the production of prilled sulphur, reference is made to FIGS. 1A and 2A. The outlet of conduit 72 terminates with a diversion baffle 74 causing prills 65 and water pumped therewith to fall upon a vibratory mechanical conveyor 80 which is supported to framework 82 by a multiplicity of intermediary leaf springs 84. A screen 86 extends across the top of the conveyor 80 which collects the prilled sulphur particles 65 thereon. A motor 88 through means of an eccentric drive 90 connected to linkage 92 in turn is attached to conveyor 80. The mechanical conveyor 80 is substantially closed along the sides, ends and bottom during the first stage of drying so that liquid particles passing downwardly through screen 86 collect in the drain 94 and by gravity flow thence to the cooling water surge tank 96.

In the second stage of drying the prilled sulphur particles 65 encounter a transverse flow of heated air from a gas fired heater 100 which is blown through conduit 102 into manifold 104 and thence passing transversely to the moving prilled sulphur particles.

At the downstream end of conveyor screen 86 is first separation screen 106 which separates the fine and regular desired size prills from the larger prilled particles, the former of which pass downward onto screen 114. The fines pass through screen 114 and collect through conduit 108 into a collection bin 110. Screen 112 separates the usable prilled particles sizes from the coarser particles permitting the former to drop onto screen 114 passing thence to screw conveyor 116 to storage. The coarser product is collected upon diversion baffle 118 and thence returned to the original supply or as desired. Both the fine and coarse material may also be used where these sizes are desired.

The prill receiver tank cooling water system generally comprises a surge tank 96 into which the weir overflow conduit 62 and conveyor drainage 94 are suitably connected. Water make-up line 120 is also connected into the surge tank. Connection is made from the surge tank to the intake of pump 122 by way of conduit 124, the pump being operated by motor 126. Since the cooling water from the prill receiver tank needs to be maintained at a constant temperature, the outlet conduit 128 leads directly into a heat exchanger 130 for adjusting the temperature of the cooling liquid with the outlet recycling to the prill receiver tank inlet conduit 52 and the water jet supply conduit 70.

OPERATION

In the operation of this invention molten elemental sulphur, not more than 320° F. preferably at approximately 280 degrees F., enters the system by way of conduit 10 into the receiver tank 12. The liquid sulphur passes through filter elements 14 and/or 16 into a constant level pool and thence by way of conduits 26 and 34 and/or 28 and 36 into the prilling head receiving tanks. The use of weirs 38 and 40 maintain the molten sulphur at a constant level above perforations 42 and/or 44 at the bottom of the constant level pool. Excess molten sulphur from the receiving tank 12 and the prilling head receiving tanks 30 and/or 32 drains through conduits 20 and 46 respectively into the manifold and drain system 22 and 24 for return to the supply source. By continuously supplying excess molten sulphur, the prilling head receiving tanks are maintained at a relatively constant temperature and hence do not require separate heating systems to maintain the molten condition of the sulphur.

Preferably two prilling head receiving tanks are utilized as shown in the drawing and each has approximately 500 No. 70 twist drill holes on one inch spacing. The molten sulphur passing through the relatively small holes remains as a constant stream until it has entered the cooling water in the prill receiver tank. The level of the cooling water used in prill receiver tank 50 is maintained approximately one-half inch to three-fourths inch below the perforations. The pressure head of sulphur will, of course, depend upon the height of weir 38 and/or 40, but preferably a head of about twelve to sixteen inches is satisfactory for a hole size (0.0280" dia.) formed from a No. 70 twist drill. As the molten sulphur stream drops into the cooling liquid, substantially spherical prills of diameter ranging in size from approximately 0.050" to approximately 0.090" in diameter are formed usually about one-half inch to one inch below the water level in the prill receiving tank. As the prills fall through the water, they are cooled and solidified before reaching the bottom of the prill receiver tank where they are collected in a location adjacent the inlet to conduit 72 and jet nozzle 68 whereby a stream of water from conduit 70 causes solidified prills 65 and jet water to pass outward from the prill receiving tank to the drying area.

Cooling water as used in prill receiving tank 50 is maintained at a constant temperature, preferably below its boiling point by the circulatory system of surge tank 96, pump 122 and heat exchanger 130.

The solidified prills and water are thence carried to one end of the conveyor 80 which is preferably a mechanical vibratory type which will cause the prilled sulphur particles 65 to be carried from one end to the other. The solidified particles 65 and excess water drop onto screen 86 during the first stage of drying whereby excess water separates and drops into the bottom of conveyor 80 where it collects, in the drain openings provided, into a common drain 94 which returns the water back to surge tank 96 for recirculation within the cooling water system. The prilled sulphur particles 65 continue to move in the direction shown and by means of the preheated air which is blown through conduit 102 into manifold 104 a constant stream of heated air is passed transverse to the moving prilled sulphur particles to eliminate any further moisture from the prilled particles 65. As the particles pass screen 106 the fines plus the desired particle size prills fall therethrough onto a second screen 114 wherein fine particles will pass through leaving the desired prilled particle size. The fines are then collected by way of conduit 108 into a receiver 110 while the desired particles are diverted outwardly into a screw conveyor 116 to storage. Remaining on the top of the screen 106 are the coarser particles which are conveyed to a distribution channel 118 for either use as needed or for return to the original supply source. In typical use, the three stage classification separates the product as follows:

| ASTM screen No. | Tyler screen No. | Size opening (inches) | Percent by weight |
| --- | --- | --- | --- |
| Greater than: | | | |
| 6 | 6 | 0.129 | 0 |
| 8 | 8 | 0.091 | 10.6 |
| 12 | 10 | 0.065 | 70.8 |
| 16 | 14 | 0.046 | 18.0 |
| 20 | 20 | 0.032 | .4 |
| Smaller than | 20 | | .2 |

It has been determined that prill size is a function of the size of the perforations in the prilling head receiving tank, the height of the perforated plate above the cooling water level and the pressure head of molten sulphur above the perforated prilling head.

This invention has been described with reference to specific and preferred embodiment. It will be apparent, however, that many modifications can be made without departing from the spirit of the invention. Accordingly, this invention should be construed not to be limited to the embodiment herein described, but should be limited only by the scope of the appended claims.

I claim:

1. Apparatus for producing dry prilled sulphur comprising in combination:
   a first receiver to maintain a constant amount of liquid sulphur from a supply source;
   a perforated prilling head and second receiver for an excess amount of said liquid sulphur from said first receiver including means to maintain a constant head of said sulphur over said prilling head such that said sulphur will pass through each of said perforations as a constant stream and means to remove excess sulphur and return same to said supply source;
   a prill forming and receiving tank, said tank having means to maintain a constant level of cooling liquid below said prilling head, whereby said liquid sulphur flowing through said perforated prilling head forms prills after submergence of each constant stream into said cooling liquid, said tank also having means to collect said prills and remove same from said tank;

means to maintain said cooling liquid at a temperature of not more than its boiling point;

a vibrating conveyor and dryer to receive said prills from said tank at one end to first permit natural separation of excess cooling liquid from said prills;

means to blow heated air around said prills on said conveyor to remove further cooling liquid; and means to size and remove said prills at the other end of said conveyor to storage.

References Cited

UNITED STATES PATENTS

| | | | |
|---|---|---|---|
| 1,614,636 | 1/1927 | Wachtel | 18—2 |
| 1,762,693 | 6/1930 | Linebarger | 18—2.7X |
| 2,574,357 | 11/1951 | Stammer et al. | 18—2.7X |
| 2,619,496 | 11/1952 | Stanton | 18—2.7X |
| 2,738,548 | 3/1956 | Kassel | 18—2.7X |
| 2,921,335 | 1/1960 | Bowers et al. | 18—2 |
| 3,206,799 | 9/1965 | Davies et al. | 18—2 |

WILLIAM S. LAWSON, Primary Examiner